Patented July 14, 1942

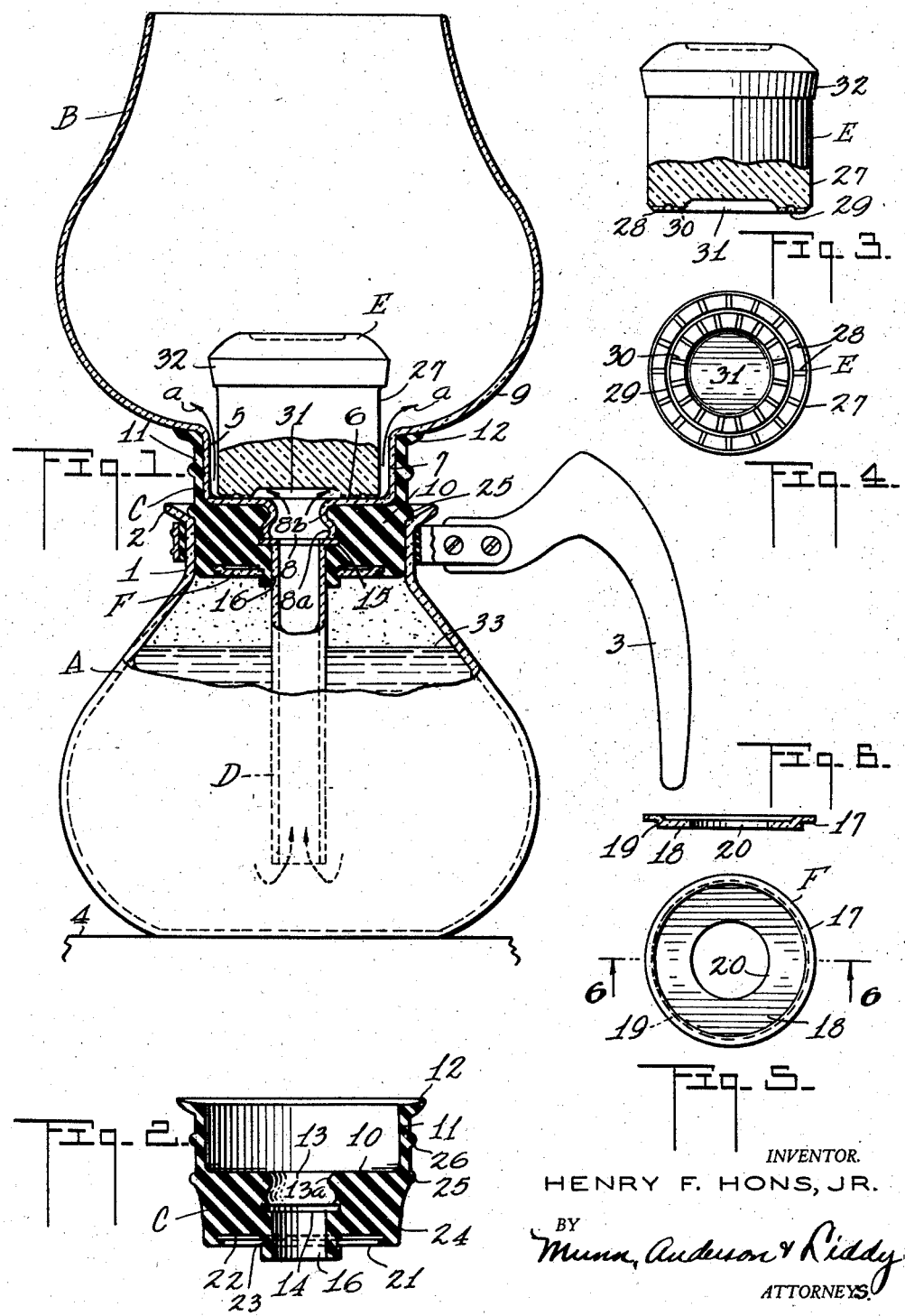

2,289,498

UNITED STATES PATENT OFFICE 2,289,498

COFFEE BREWER WITH FILTER

Henry F. Hons, Jr., San Francisco, Calif.

Application September 11, 1940, Serial No. 356,271

6 Claims. (Cl. 53—3)

The present invention relates to improvements in a coffee brewer with filter, and it consists of the combinations, constructions and arrangements hereinafter described and claimed.

An object of my invention is to provide a coffee brewer with filter that is an improvement over the invention shown in my copending application, Serial No. 315,316, filed January 24, 1940. In the copending application, I set forth a coffee brewer comprising a lower and an upper receptacle, with a tube removably secured to the upper receptacle by a gasket. The latter permits angular movement between the tube and the upper receptacle and prevents breakage from occurring between the parts. The gasket also acts as a seal between the two receptacles.

In the present invention, the gasket has a relatively thick portion that serves as a cover for the lower receptacle, and this portion has a socket-shaped recess with an enlarged interior for removably receiving an outlet formed integral with the upper receptacle and having an enlarged head that fits snugly into the recess. The gasket also removably receives a tube that normally extends down into the lower receptacle a predetermined distance. Other structural points of the gasket with their advantages will be set forth in the description.

A distinct inventive improvement over the copending case resides in the provision of a filter of novel construction. The filter is received in a cylindrical depression formed in the bottom of the upper receptacle. This depression and the centrally-disposed outlet of the upper receptacle are received in the gasket. The filter is preferably made of porcelain and has an outer diameter slightly smaller than the inner diameter of the depression. The filter base rests on and parallels the bottom of the cylindrical depression and has shallow staggered grooves, which will permit water to flow therethrough, while retaining the coffee grounds in the upper receptacle. A clear coffee liquid is made in this manner, free from coffee grounds, and no filter cloth is needed. The weight of the filter holds it down in place.

Other objects and advantages will appear as the specification proceeds, and the novel features of my invention will be particularly set forth in the appended claims.

My invention is illustrated in the accompanying drawing, forming part of this application, in which:

Figure 1 is a vertical section through the coffee brewer and filter, parts being shown in elevation;

Figure 2 is a longitudinal section through the gasket;

Figure 3 is a side elevation of the filter with the base shown in section;

Figure 4 is a plan view of the filter base;

Figure 5 is a plan view of a disc used in connection with the gasket;

Figure 6 is a section along the line 6—6 of Figure 5.

While I have shown only the preferred form of my invention, it should be understood that various changes or modifications may be made within the scope of the annexed claims without departing from the spirit of the invention.

In carrying out my invention, I provide a lower receptacle A, an upper receptacle B, a gasket C interconnecting the two receptacles, a removable tube D, and a filter E. These parts will be described in the order given.

The lower receptacle A is preferably made of glass and has a neck portion 1 with an outwardly-flared rim 2. A handle 3 is secured to the neck 1 and provides a means for moving the receptacle from place to place. A supporting surface for the receptacle is indicated at 4, which may be a heating unit, such as a gas or electric burner.

The receptacle B is bowl-shaped and has a cylindrical depression 5 with a flat bottom wall 6 extending at right angles to the cylindrical wall 7. The longitudinal axis of the cylindrical portion 5 is preferably aligned with the axis of the glass receptacle B. At the center of the flat wall 6 I provide an outlet spout 8, that has an enlarged head 8a for the purpose presently to be described. The bowl portion 9 of the upper receptacle extends directly from the cylindrical depression 5.

The two receptacles A and B are removably connected together by the gasket C, the latter being preferably made of rubber. The gasket is illustrated in Figure 2, and it will be noted that it has a thick base 10 with an upstanding annular thin flange 11 and an outwardly-turned rim 12. The relatively thin flange 11 receives the cylindrical depressed portion 5 of the upper receptacle B, while the outwardly-turned rim 12 bears against the adjacent bowl-shaped portion 9, see Figure 1. The base 10 acts as a closure for the lower receptacle A. It will be noted that the base 10 spaces the depression 5 above the rim 2, and this allows expansion of the wall 7 without exerting any pressure on the neck 1. No breakage will occur between the two receptacles.

The base 10 has a socket 13 shaped similarly to the outlet spout 8 and designed to snugly receive the spout for firmly connecting the gasket to the upper receptacle and preventing its accidental removal when the gasket and receptacle are removed from the lower receptacle A. The annular inwardly-extending rib 13a is received in the annular groove 8b formed in the outer surface of the spout 8 adjacent to the flat wall 6.

The base 10 also has an annular groove 14 disposed adjacent to the socket 13 and designed to receive a washer 15. The washer separates the glass outlet spout 8 from the removable glass tube D. The tube D is received in a bore 16 that communicates with the socket 13. The upper end of the tube bears against the washer 15 and is prevented from contacting with the spout 8. In this way breakage or chipping between the two glass parts is prevented, while communication between the spout and tube is established. The washer may be made of a plastic material, if desired. It will be seen that the fluid flowing in either direction through the spout and tube does not contact with the rubber gasket. This is true even though relative angular movement between the tube and spout is possible.

In Figures 5 and 6, I illustrate a disc F that has an outwardly-extending flange 17 offset from the body 18 to provide a shoulder 19. A large central opening 20 is formed in the body 18. The base 10 of the gasket C has an annular depression 21 for receiving the body 18 of the disc F, and an annular groove 22 in the bottom of the outer wall of the depression receives the flange 17. The inner wall of the depression 21 has a groove 23 for receiving the rim defining the opening 20. Figure 1 illustrates the disc F as being secured in place to the underside of the gasket base 10. The purpose of the disc is to reduce the area of the rubber gasket that is exposed to the hot water and steam in the lower receptacle A and also to reinforce the gasket base.

The outer periphery of the base 10 is slightly tapered at 24 and has a diameter to be snugly received in the neck 1 of the lower receptacle. An annular rib 25 seats on the rim 2 and limits the downward movement of the gasket into the lower receptacle. The gasket acts as a closure for the lower receptacle. A second annular rib 26 encircles the wall or flange 11 and reinforces the latter. The wall 11 is sufficiently flexible to permit it to be manually forced away from the wall 7 when removing the gasket from the upper receptacle.

The filter E is illustrated in Figures 3 and 4, and the filter is preferably made of porcelain and has sufficient weight to reseat on the flat bottom wall 6 during the movement of the liquid from the upper to the lower receptacle. Porcelain will not break as readily as glass. The diameter of the filter wall 27 is less than the inner diameter of the cylindrical wall 7, thus providing a space between the walls of about three sixteenths of an inch ($\frac{3}{16}$") or more. I have found that this space is sufficient to permit the water to flow downwardly through the coffee grounds without packing them to an extent that will unnecessarily impede the water flow. The large diameter of the filter will also cause the greater amount of the coffee grounds to remain in the bowl portion 9 of the upper receptacle and thus permit a better mixing of the hot water with the coffee prior to the return of the brew to the lower receptacle.

Before describing the entire operation of the coffee filter E, I will set forth the construction of the filter base. The latter is illustrated in detail in Figure 4. An outer set of radially-extending shallow grooves 28 lie between the outer face 27 of the filter and a circular groove 29. The depth of the shallow grooves 28 is such as to prevent the coffee grounds from passing therethrough, while permitting water to flow through these grooves. Any coffee sediment that is so fine as to pass through the grooves 28 will be trapped in the circular groove 29. The grooves 28 and 29 are formed into passageways for the water by the flat bottom wall 6.

An inner set of radially-extending grooves 30 communicate with and extend inwardly from the circular groove 29. The grooves 30 are staggered with respect to the grooves 28 and the inner ends of the grooves 30 communicate with a steam or vapor dome 31. The dome 31 is positioned over the outlet spout 8 when the filter is in place. Any sediment or fine coffee grounds that might pass the outer set of grooves 28 will be trapped by the circular groove 29. The groove 29 is deeper than the grooves 28 or 30 and, therefore, the water flowing in the groove 29 will be slowed down sufficiently to retard the movement of any coffee grounds or sediment that might have been carried through any one or more of the outer set of shallow grooves 28. This fact, plus the one that the inner set of shallow grooves 30 are staggered with respect to the outer set, prevents any grounds or sediment from passing through the shallow grooves 30 and into the vapor or steam dome 31 and thence into the lower receptacle A.

The broad base of the filter E directs the upward flow of water from the lower to the upper receptacle in an outward direction, as indicated by the arrows a in Figure 1. The outward flow of boiling water will be directed to the side of the bowl-shaped portion 9, rather than upwardly, and this will permit the device to remain on the heater after the water in the lower receptacle starts to boil without some of this water surging upwardly through the tube D and also in a vertical direction up through the upper receptacle B where it will spill over the top of the receptacle.

As a further aid in directing the boiling water in an outward direction, I provide the top of the filter with an enlarged portion 32, that has an outwardly-inclined wall, the smaller end being disposed downwardly. Any water flowing upwardly along the filter will strike the enlarged portion and will be deflected outwardly. In this way, the water is prevented from boiling over the top of the upper receptacle. The enlarged filter head, which is frusto-conical, acts as a knob for permitting the ready gripping of the filter when disposing it in place in the upper receptacle or removing it therefrom.

From the foregoing description of the various parts of the device, the operation thereof may be readily understood. A desired amount of water 33 is placed in the lower receptacle A, and then the upper receptacle, with its gasket C and tube D, secured in position. The filter E is mounted in the depression 5 and is spaced from the wall 7. Ground coffee is now added to the upper receptacle of a quantity sufficient to make a brew of the desired strength. The entire device is now placed over a heating unit.

The gasket C seals the top of the lower receptacle A and steam or water vapor will be generated from the heated water to such an extent that it will force the water from the lower receptacle up through the tube D and into the upper receptacle, as indicated by the arrows in Figure 1. The disc F covers the greater part of the gasket bottom and thus prevents any boiled rubber taste from being found in the coffee brew.

The water, in flowing upwardly through the tube D and spout 8, is kept from contacting with the rubber gasket.

The velocity of the upward flowing boiling water, when striking the filter, may have sufficient force to temporarily lift the filter to a slight extent above the bottom wall 6. The steam dome 31 dissipates the pressure and prevents undue bouncing of the filter. The upward flowing water will carry the coffee grounds therewith so that none of the coffee will be able to escape downwardly into the lower receptacle. The weight of the filter is such as to preclude the lifting thereof above the top of the depression 5 by the upward flowing water. The space between the filter and the wall 7 is sufficient to prevent the filter from being "hung up" when lifted by the water and remaining in raised position after the upward flow of water subsides.

The filter will seat on the bottom wall 6 due to its weight and the vacuum created in the lower receptacle and this occurs before any coffee grounds start to pass into the depression 5. During the upward water flow, the weight and large diameter of the filter, plus the enlarged filter head 32, will direct the water radially into the bowl, rather than upwardly and will prevent any spilling over of the water from the upper receptacle. A more intimate mixing of the coffee with the water also results.

The shallow staggered grooves 28 and 30 act as a filter for the coffee grounds and do away with the necessity of using a screen or cloth filter. The depth of the radial grooves is preferably five thousandths of an inch. The water returns from the upper receptacle to the lower one as soon as the pressure in the latter is relieved. A thorough mixing of the hot water with the ground coffee has taken place before the water returns to the lower receptacle. The coffee grounds are retained in the upper receptacle and only the clear coffee brew will return to the lower receptacle. The greater portion of the coffee grounds remain in the bowl portion 9 and are easily removed.

The removable tube D prevents breakage between the tube and the upper receptacle and also permits the receptacle to be washed in a smaller dish pan when the tube is removed. The upper receptacle with the tube removed, but with the gasket attached thereto, may be packed in a smaller box than would be possible with a non-removable tube. The gasket thus acts as a shock absorber for the upper receptacle.

I claim:

1. A weighted filter having staggered intercommunicating shallow grooves on its under surface, the grooves being of a depth which will permit water to flow therethrough when the open sides of the grooves are covered, but which will prevent coffee grounds from passing therethrough, the staggering of the grooves slowing up the flow of water therethrough to reduce the speed of the fluid to a point where it will be insufficient to convey coffee grounds through the grooves that might otherwise be small enough to pass along the grooves.

2. A filter having a central cavity in its bottom face and a circular groove spaced from the cavity, the base of the filter having a set of grooves extending from the cavity to the circular groove and a second set of grooves extending from the circular groove to the outer circumference of the filter base, the grooves on one side of the circular groove being staggered with respect to the grooves on the other side thereof.

3. A filter having a central cavity in its bottom face and a circular groove spaced from the cavity, the base of the filter having a set of grooves extending from the cavity to the circular groove and a second set of grooves extending from the circular groove to the outer circumference of the filter base, the circular groove being of a greater depth than the other grooves.

4. The combination with a receptacle having a depression in its lower portion and an outlet opening in the bottom wall of the depression, of a weighted filter substantially filling the depression, but slightly spaced from the side wall of the depression, the filter having shallow staggered grooves in its base formed into passageways by the bottom wall of the depression, the filter base having a cavity in its central portion communicating with the grooves and overlying the outlet opening, said grooves extending to the outer periphery of the filter base, the staggering of the grooves permitting water to flow therethrough, but slowing its speed for preventing coffee grounds from passing therethrough.

5. A filter having two sets of grooves, the grooves in one set being staggered with respect to the grooves in the other set, and a common groove interconnecting the grooves of one set with those of the other, the grooves being of a depth which will permit fluid to flow therethrough when the open sides of the grooves are covered, but which will prevent the material in the fluid from passing therethrough.

6. A filter having a surface with a central depression, a set of radially extending shallow grooves communicating with the depression, a circular groove communicating with the outer ends of the first-named grooves, and a second set of radially extending grooves staggered with respect to the grooves in the first set and communicating with the circular grooves, the grooves being of a depth which will permit fluid to flow therethrough when the open sides of the grooves are covered, but which will prevent the material in the fluid from passing therethrough.

HENRY F. HONS, Jr.